(No Model.)
S. M. & M. COFFMAN.
GATE.
No. 438,987. Patented Oct. 21, 1890.
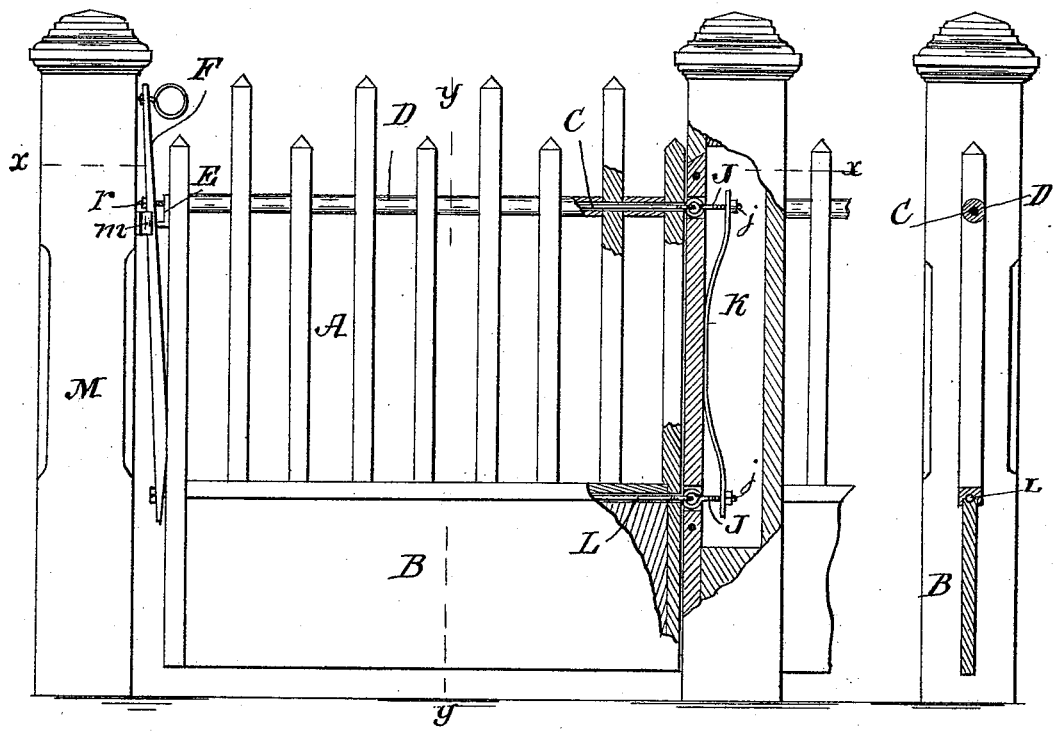
Witnesses
Saml R. Turner.
Van Buren Hillyard.
Inventor
Samuel M. Coffman.
Martin Coffman.
By his Attorneys

UNITED STATES PATENT OFFICE.

SAMUEL M. COFFMAN AND MARTIN COFFMAN, OF GEORGEVILLE, MISSOURI.

GATE.

SPECIFICATION forming part of Letters Patent No. 438,987, dated October 21, 1890.

Application filed May 9, 1890. Serial No. 351,149. (No model.)

*To all whom it may concern:*

Be it known that we, SAMUEL M. COFFMAN and MARTIN COFFMAN, citizens of the United States, residing at Georgeville, in the county of Ray and State of Missouri, have invented certain new and useful Improvements in Gates; and we do hereby declare the following to be a full, clear, and exact description of the invention, such as will enable others skilled in the art to which it appertains to make and use the same.

This invention aims to provide a gate which will be simple in construction and efficient and durable, and which will admit of adjustment to compensate for contraction and expansion.

A further object of the invention is to provide a gate that can be opened from either side and which will close automatically by a positive motion.

The improvement consists of the novel features, which will be hereinafter more fully described and claimed, and which are shown in the accompanying drawings, in which—

Figure 1 is a side view, parts being broken away, of a picket-fence and gate embodying my invention. Fig. 2 is a horizontal section on the line X X of Fig. 1, showing the operation of the gate by dotted lines. Fig. 3 is a section on the line Y Y of Fig. 1.

The fence-panels and the gate are similarly constructed, being composed of pickets A, a bottom rail B, to which the lower ends of the pickets are nailed or otherwise secured, a rod C, passing through the upper ends of the pickets, and spacing-blocks D between the pickets, also strung on the rod C. One or both ends of rod C are threaded to receive a tension device, which may be a nut or guide. The guide E is applied to the rod at the free end of the gate, and the bent end $e$ thereof is adapted to enter an opening $f$ in the latch F and guide the said latch in its movements. The nut $f$ on the end of the rod C forms a stop for the latch and limits the outward movement of the said latch.

The rods J, which form the hinge-connection between the gate and the gate-post, are acted on by a spring K, which draws the gate to the post with a positive but yielding pressure. The rods J are pivotally connected with the gate at their outer ends, and their inner ends are threaded and pass through the gate-post, or a portion thereof, and have nuts $j$. The spring K, placed between the post and the said nuts, is the means for closing the gate after it is opened. To equalize the pressure the spring K is bow-shaped and its middle portion rests against the post, as shown. In case the spring becomes weak its tension can be increased by screwing up the nuts $j$ on the rods J.

The latch F is rounded near its lower end, and has a yielding connection with the gate by rod L, which passes beneath or through a groove in the lower rail, and has the rod J connected therewith. The latch rocks on the rounded portion, and the spring K also serves to hold the lower end thereof close to the gate.

The stop $m$ on the gate-post M is double inclined, so as to permit the gate to close from either side.

The operation of the gate is as follows: When opening the gate, the corner of the batten adjacent to the post to which the gate is hinged forms a fulcrum for the gate, which turns thereon, and effects a compression of the spring K. When the gate is released after being opened, the spring K resumes its normal position and effects a closing of the gate. The operation is the same if the gate is opened from either side.

Having thus described our invention, what we claim, and desire to secure by Letters Patent, is—

1. The combination, with the gate-post and the gate, of rods J, adjustable nuts on the inner ends of the rods J, and a spring between the gate-post and said nuts, substantially as and for the purpose described.

2. The combination, with the gate and the latch F, of the rod C, having its end extending through the latch, the nut on the outer end of said rod, and the guide E, having its bent end projecting into an opening in the said latch, substantially as and for the purpose described.

3. The combination, with the gate and the latch having a fulcrum between its ends, of the rod and spring holding the lower end of the latch against the gate with a yielding pressure, substantially as and for the purpose described.

4. The combination, with the gate-post and the gate, of the rods L and J, the spring K, and the latch F, substantially as and for the purpose described.

In testimony whereof we affix our signatures in presence of two witnesses.

SAMUEL M. COFFMAN.
   MARTIN COFFMAN.

Witnesses:
 JOHN TAIT,
 S. M. TAIT.